No. 816,814. PATENTED APR. 3, 1906.
C. F. NELSON.
ANIMAL TRAP.
APPLICATION FILED JULY 12, 1904.
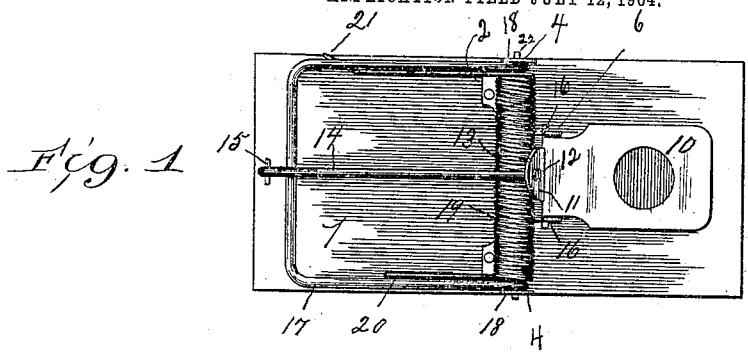
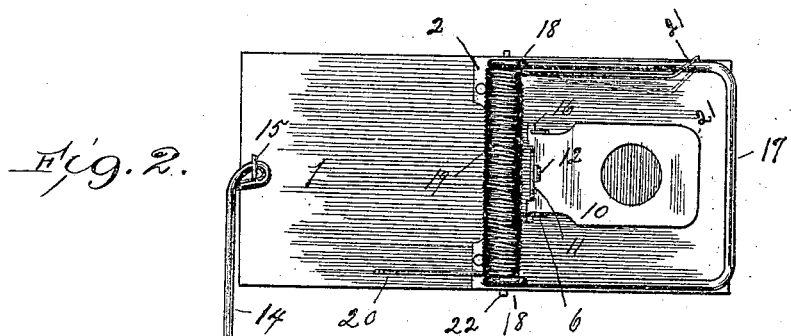
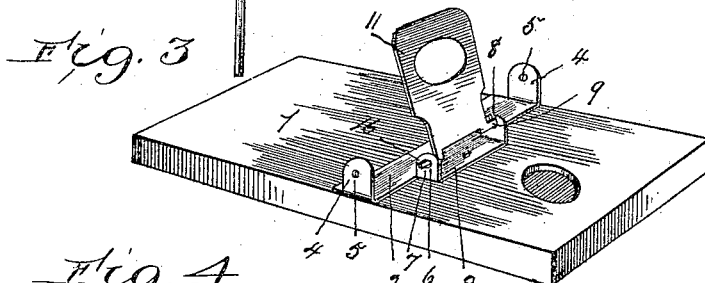
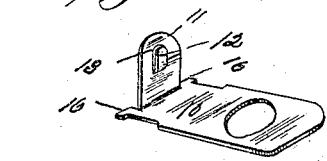
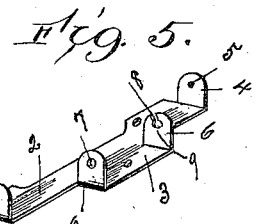
Witnesses:
Harry R. White
Ray White
Inventor:
C. F. Nelson,
By H. M. Richards, Atty.

UNITED STATES PATENT OFFICE.

CHARLES F. NELSON, OF GALESBURG, ILLINOIS, ASSIGNOR TO E-Z MANUFACTURING COMPANY, OF GALESBURG, ILLINOIS, A CORPORATION OF ILLINOIS.

ANIMAL-TRAP.

No. 816,814. Specification of Letters Patent. Patented April 3, 1906.

Application filed July 12, 1904. Serial No. 216,262.

*To all whom it may concern:*

Be it known that I, CHARLES F. NELSON, a citizen of the United States, residing at Galesburg, in the county of Knox and State of Illinois, have invented a certain new and useful Improvement in Animal-Traps, of which the following is a specification.

The invention relates to improvements in traps, and particularly to that class thereof in which a spring-actuated jaw is adapted to be thrown with great force from one to the other end of a base upon which it is mounted and to catch and hold the animal thereunder; and the primary object thereof is to provide a device in which the tripping-lever and parts which carry it may be assembled without bending or distorting any of the parts thereof and without the use of tools, to effect saving of time, labor, and expense, and to achieve a perfect assemblage in which the parts are always equidistant.

Another object of the invention is to provide a simple and efficient device which will be instantly sprung at the slightest attempt of the animal to reach the bait or to pass over the tripping-lever or the locking-bar.

A further object is to so arrange said parts that when they are arranged in place they will be firmly and securely held in place by another part of the trap, which part is carried on a rod or shaft seated in bearings in the base-plate, without the use of tools and without bending.

A further object is to provide a trap of the character described wherein the jaw may be instantly thrown into or out of engagement with the spring.

A further object is to provide simple and effective means for setting the trap.

To the end of carrying out these objects of my invention it consists in features of construction and in combinations of parts hereinafter described. These main features of the invention, as also subsidiary features, are made the subject-matter of the invention.

Mechanism showing the arrangement, connection, and mutual relationship of the several parts of my improvements and the adjacent parts of a trap in which my improvements are incorporated is illustrated in the accompanying drawings, in which—

Figure 1 is a top plan of the trap in its set position; Fig. 2, a similar view, but showing the trap in its sprung position; Fig. 3, an elevation of parts; Figs. 4 and 5, details; Fig. 6, an end view, and Fig. 7 a modification.

Referring now to the drawings by numerals, the same numeral indicating the same part in the different figures thereof, 1 represents the base, which may be of wood or metal, as preferred.

2 is a base-plate secured to the base (when of wood) in any desired or preferred manner, and has an arm 3 projecting therefrom. The extended ends of the base-plate 2 are turned upwardly to form ears 4, having perforations 5. The ends of the arm 3 are turned upwardly to form ears 6, one of which has preferably an eye 7 and the other of which has a narrow slot 8 leading to an eye 9. I desire it understood that slots 8 may be cut to both eyes, if preferred, and that while I prefer that the base-plate and the arm be integral they may be formed of separate pieces.

10 represents the tripping-lever of sheet metal, having its rearwardly-projecting end 11 upturned. An aperture 13 and a dent 12 are formed in the end 11 by stamping or die-cutting an integral part 12 partly therefrom and forcing it partly forward, whereby the upper end of the aperture 13 will form a catch and the part 12 will form a detent for limiting the engagement therewith of the ordinary locking-lever 14, which may be secured to the base by a staple 15 or in any desired manner. A portion of the tripping-lever is cut away to form studs 16, which project from its sides and are of greater breadth than thickness, as shown best at Fig. 4.

17 is a substantially U-shaped jaw having loops 18 at its ends.

19 is a coiled forcing-spring having one of its ends 20 extended rearwardly and driven into the base and its other end 21 extended forwardly and overriding an arm of the jaw when in its sprung position and underlying said arm when in its set position to actuate it.

A rod 22 is passed through the eyes 4 in the base-plate, through the loops 18 in the end of the jaw, and through the coils of the spring 19 to hold said parts in operative engagement. Said parts being in the position shown at Fig. 2 and it being desired to set the trap, the jaw is brought over rearwardly, whereby the jaw will be given an additional one-half coil and its extended end 21 brought down under it. The free end of the locking-bar 14 is then brought forwardly and the forward end of the tripping-lever slightly raised, whereby the free end of the bar may be engaged with the upper edge of the aperture; but its extent of engagement therewith will be limited by the detent 12. The parts being then in the position indicated at Fig. 1, should an animal touch the tripping-lever or locking-bar, even very lightly, the locking-bar will be instantly disengaged from the catch and the jaw will be thrown over with great force by the extended end 21 of the spring 19, the other end of which prevents the coils from turning. The tripping-lever or the base, or both, may have bait-openings, as shown, or they may be omitted.

It is very desirable to have traps which may be easily and quickly thrown out of spring action when not in use. This I effect by throwing the extended arm 21 of the spring inwardly and out of engagement with the jaw 17, as shown by dotted lines at Fig. 2. The jaw and the spring being then entirely independent of each other, all danger in handling the trap is averted.

As shown best at Fig. 5, the slot 8, leading to the eye 9 in the upturned end 6 of the arm 3, is somewhat narrower than said eye, and the studs 16 are of a thickness such that one of them will pass freely through said slot when in the position shown at Fig. 3; but when in any other position its breadth is such that it can neither be passed through nor withdrawn therefrom.

I am aware that traps having base-plates and arms and both having perforations in upturned ends thereof have been heretofore constructed, and I hereby disclaim such feature broadly. So far as my knowledge extends, however, no trap has heretofore appeared in which the studs on the tripping-lever could be seated in such perforations (eyes) without one at least of the ears being inclined outwardly before the studs could be inserted, and then after a stud had been inserted in an eye in one ear the other ear had to be forced or driven upwardly to insert and hold the the other stud, such operation often breaking or distorting the last-named stud and ruining the trap and causing loss of both material and labor. The slot or way 8, which leads to one of the eyes 6 and which constitutes the main feature of the invention, precludes possibility of such mishap occurring. By its use both time and expense are saved in assembling the respective parts. As the ears are bent upward by the same die and at the same operation which cuts the completed plate from the raw material, a more perfect fit, and therefore more perfect device, is had.

The parts are assembled by first setting the tripping-lever into the position at Fig. 5 with one of the studs thereof in the eye 7 and the other passed down through the slot 8 and into the eye 9. This is performed without the use of any tool and without bending or straining of the parts. The free end of the tripping-lever is then dropped, the jaw set in place, then the spring, with its arm 20, bent or driven into the base. The rod 22 is then passed partly into place, the end 21 of the spring given a full revolution, and the rod pushed forwardly to and through the distal eye 5. It will be seen that the spring will in these positions of said parts arrest the movement rearwardly of the upturned end 11 of the tripping-lever and that the studs cannot escape from the eyes 7 and 9.

The modification at Fig. 7 illustrates a base-plate and arm constructed as are the same parts elsewhere shown in the drawings, except that both the perforations in the ears 6 are slotted.

Having thus described my invention, what I claim as new, and desire to secure by Letters Patent, is—

1. A trap comprising a base, a base-plate secured thereto having perforated ears at its ends, and an arm or plate integral with the base-plate and having perforated ears, and a slot or way in one of last aforesaid ears leading to one of said last-named perforations.

2. In an animal-trap, a base, a base-plate secured thereto transversely thereof, upturned perforated ears at the ends of said plate, an arm extending from said plate and having perforated ears at the ends thereof, one of said last-named ears having a slot leading to the perforation therein, and a tripping-lever having studs adapted to engage with said perforations and slot.

3. A trap comprising a base, a base-plate secured thereto, an arm or plate having eyes, a way leading to one of said eyes, a tripping-lever having studs greater in one cross-dimension than in the other, a locking-lever and a spring-actuated jaw.

4. A trap comprising a base, a base-plate and an arm integral therewith fixed to said base, said arm having perforated ears and a slot leading to one of said perforations, and a tripping-lever having studs adapted to be seated in said perforations, one of said studs being of such shape that it will pass freely through said slot when in one position but in no other.

5. A trap comprising a base, a base-plate and an arm integral therewith fixed to said base, said arm having perforated ears, a slot in one of said ears, a tripping-lever having studs adapted to be seated in said perforations, one of said studs being adapted to pass freely through said slot when in one position but in no other, a locking-lever, a jaw, and a spring adapted to actuate said jaw and to hold the tripping-lever in such position that it cannot be disengaged from said perforations.

6. A trap comprising a base, a base-plate secured thereto, an arm or plate having eyes, a way leading to one of said eyes, a tripping-lever having studs the thickness of which is small in comparison with their other dimensions, a locking-lever and a spring-actuated jaw.

7. In a trap, an integral base-plate and arm, said arm having upturned ends, one of said ends having a perforation and the other a slotted eye.

8. A tripping-lever for animal-traps comprising an extended major portion, an upturned end, an aperture in said end and a detent overlying said aperture.

9. In a trap, a base, a base-plate, perforated ears at the end of said plate, and an arm or plate having its ends turned upwardly, a perforation in one of said last-named ends and a slot in the other.

CHARLES F. NELSON.

Witnesses:
L. M. RICHARDS,
C. M. S. RICHARDS.